United States Patent
Itoh et al.

(10) Patent No.: US 6,468,342 B1
(45) Date of Patent: Oct. 22, 2002

(54) AQUEOUS PIGMENT DISPERSION AND PROCESS FOR PRODUCING THE SAME

(75) Inventors: Sohko Itoh; Tatsuya Yagyu, both of Neyagawa; Nobuyuki Murai, Osaka; Makiko Matsui, Hirakata, all of (JP)

(73) Assignee: Orient Chemical Industries, Ltd., Osaka-fu (JP)

( * ) Notice: Subject to any disclaimer, the term of this patent is extended or adjusted under 35 U.S.C. 154(b) by 0 days.

(21) Appl. No.: 09/762,597

(22) PCT Filed: Jun. 7, 2000

(86) PCT No.: PCT/JP00/03680

§ 371 (c)(1),
(2), (4) Date: Feb. 9, 2001

(87) PCT Pub. No.: WO00/75246

PCT Pub. Date: Dec. 14, 2000

(51) Int. Cl.[7] .......................... C09C 17/00; C09C 11/00
(52) U.S. Cl. .................... 106/478; 106/472; 423/449.4
(58) Field of Search ................................. 106/472, 478; 423/449.4

(56) References Cited

U.S. PATENT DOCUMENTS

| 5,718,746 A | 2/1998 | Nagasawa et al. | ......... | 106/31.9 |
| 5,985,016 A | 11/1999 | Tsang et al. | ............. | 106/31.32 |
| 6,123,759 A | * 9/2000 | Mise et al. | ................ | 106/31.9 |

FOREIGN PATENT DOCUMENTS

| EP | 0688836 | 12/1995 |
| EP | A1733682 | 9/1996 |
| EP | A1896986 | 2/1999 |
| JP | 64006074 | 1/1989 |
| JP | 64031881 | 2/1989 |
| JP | 83498 | 1/1996 |
| JP | 8319444 | 3/1996 |
| JP | 10120958 | 5/1998 |
| JP | A11192703 | 4/1999 |
| JP | 11222573 | 8/1999 |
| JP | A2000017191 | 1/2000 |

* cited by examiner

*Primary Examiner*—Anthony J. Green
(74) *Attorney, Agent, or Firm*—Birch, Stewart, Kolasch & Birch, LLP

(57) ABSTRACT

It is provided an aqueous pigment dispersion having improved dispersing stability in which carbon black shows appropriate initial dispersing property and long-term dispersing property to water, and carbon black particles are less susceptible to aggregation. Moreover, it is provided a raw material for ink-jet ink having improved printing density when alkali metal cation is substituted by potassium ion. The present invention is summarized as an aqueous pigment dispersion, which contains surface modified carbon black that is obtained by wet-oxidizing carbon black by using hypohalous acid and/or a salt thereof, and alkali metal cation, characterized in that concentration of the alkali metal cation is not more than 2% by weight.

1 Claim, No Drawings

AQUEOUS PIGMENT DISPERSION AND PROCESS FOR PRODUCING THE SAME

This application is the national phase under 35 U.S.C. §371 of PCT International Application No. PCT/JP00/03680 which has an International filing date of Jun. 7, 2000, which designated the United States of America.

TECHNICAL FIELD

The present invention relates to an aqueous pigment dispersion, and more particularly concerns an aqueous pigment dispersion containing carbon black having improved long-term aqueous dispersing property as a colorant and a preparation method thereof as well as an aqueous dispersion capable of increasing a writing or printing density and a preparation method thereof.

BACKGROUND OF THE INVENTION

Conventionally, aqueous dye ink containing a black dye has been mainly used as a recording solution used for writing tools and ink-jet printers. In recent years, in order to improve picture quality and durability of a recorded object, aqueous pigment ink using a pigment such as carbon black has received much attention.

For example, Japanese Patent Laid-Open Publication No. 6074/1989 and Japanese Patent Laid-Open Publication No. 31881/1989 have disclosed aqueous pigment ink in which carbon black is dispersed by using a surfactant and a polymer dispersant.

However, in this type of ink, when content of the colorant in ink is increased in order to raise printing density of a recorded object, the problem arises of which ink viscosity rapidly increases at the same time. Moreover, in order to stably disperse carbon black, it is necessary to add excessive amounts of a surfactant and a polymer dispersant; however, these may cause generation of bubbles and degradation in antifoaming property, resulting in degradation of printing stability, especially in the case of the application of ink-jet recording ink.

In order to solve the above-mentioned problems, Japanese Patent Laid-Open Publication No. 3498/1996 and Japanese Patent Laid-Open Publication No. 120958/1998 have disclosed an aqueous pigment dispersion in which carbon black is wet-oxidized by using hypohalite so that a group containing certain amount of active hydrogen (for example, a carboxyl group or a hydroxyl group) or a salt thereof is introduced onto a surface of carbon black, thereby allowing the surface modified carbon black itself to spontaneously disperse without the need of a surfactant and a polymer dispersant.

On the other hand, with respect to a refining method for macromolecule chromophore (MMC) for forming a pigment for ink-jet ink, Japanese Patent Laid-Open Publication No. 222573/1999 has disclosed a method in which: an aqueous solution of MMC is prepared, a liquid having desired counter ion is added to the solution, this is membrane-filtered, and the liquid addition and the filtration are repeated so that crust formation and corrugation are reduced, thereby making it possible to improve reliability of ink, such as long-term ink stability.

SUMMARY OF THE INVENTION

The first objective of the present invention is to further improve the above-mentioned surface modified carbon black in its initial dispersing property to water and in its long-term dispersing property, and consequently to provide an aqueous pigment dispersion that is less susceptible to aggregation of carbon black particles and has superior dispersion stability. The second objective of the present invention is to provide an aqueous pigment dispersion that provides superior printing density when used as ink-jet ink.

In general, surface modified carbon black, obtained by wet-oxidizing carbon black by using hypohalite, contains a great amount of alkali metal cation and halogen ion, in particular, chlorine ion. This is because upon oxidizing carbon black, hypohalite generates an alkali metal cation and halogen ion.

The inventors of the present invention have found that amounts and kinds of alkali metal cation and halogen ion give influences on the surface modified carbon black in its dispersing stability to water and in its printing density and the like when used as ink-jet ink. Then, they have further found that it is possible to greatly improve the surface modified carbon black in its dispersing stability to water by limiting concentration of alkali metal cation and halogen ion contained in the aqueous pigment dispersion, and also to greatly improve its printing density as ink jet ink by specifying kinds of the alkali metal cation; thus, the present invention has been accomplished.

The present invention provides an aqueous pigment dispersion containing surface modified carbon black that is obtained by wet-oxidizing carbon black by using hypohalous acid and/or a salt thereof, and alkali metal cation, and the aqueous pigment dispersion is characterized in that concentration of the alkali metal cation is not more than 2% by weight.

Moreover, the present invention provides an aqueous pigment dispersion containing surface modified carbon black that is obtained by wet-oxidizing carbon black by using hypohalous acid and/or a salt thereof, alkali metal cation and halogen ion, and the aqueous pigment dispersion is characterized in that concentration of the alkali metal cation is not more than 2% by weight and concentration of the halogen ion is not more than 1000 ppm.

With respect to the alkali metal cation, potassium ion and rubidium ion are preferably used.

An aqueous pigment dispersion of the present invention is preferably prepared by using a method that has the steps of: finely dispersing carbon black into water; oxidizing the carbon black by using hypohalous acid and/or a salt thereof; and adjusting concentration of alkali metal cation in the solution to not more than 2% by weight. This method may also include the step of adjusting concentration of halogen ion to not more than 1000 ppm, and may further include the step of substituting alkali metal ion in the solution by potassium ion.

DETAILED DESCRIPTION OF THE INVENTION

An aqueous pigment dispersion of the present invention contains surface modified carbon black that is obtained by wet-oxidizing carbon black by using hypohalous acid and/or a salt thereof, and in the aqueous pigment dispersion, alkali metal cation and halogen ion generated upon wet-oxidizing carbon black are removed to not more than certain amount.

Here, the alkali metal cation refer to lithium ion ($Li^+$), sodium ion ($Na^+$), potassium ion ($K^+$), rubidium ion ($Rb^+$), cesium ion ($Cs^+$) and the like. Concentration of alkali metal cation in the aqueous pigment dispersion may be measured by using, for example, an atomic absorption analysis method.

In this case, halogen ion refers to chlorine ion (Cl⁻), bromine ion (Br⁻), iodine ion (I⁻) and the like. Amount of halogen ion in the aqueous pigment dispersion may be measured by using, for example, an ion electrode.

With respect to carbon black as raw materials, coloring carbon black generally available in the market may be used. More specifically, when classified based upon pH, any of acidic carbon black, neutral carbon black and basic carbon black may be used, and when classified based upon a manufacturing method, any of furnace-type carbon black, channel-type carbon black, acetylene-type carbon black and thermal-type carbon black may be used.

Specific examples of carbon black used in the present invention include: #900, MA600 and MA77 (made by Mitsubishi Kagaku K.K.), Color Black FW18, Color Black S170, Special Black 4A and Printex 30 (made by Degussa Corp.), Monarch 880, Regal 250R, Regal 400R and Regal 660R (made by Cabot Corp.), Raven 1040, Raven 1255 and Conductex SC ULTRA (made by Columbian Chemicals Co.). Here, these are only examples of preferable carbon black, and the present invention is not intended to be limited by these.

In the present invention, such carbon black as raw materials is wet-oxidized in water by using hypohalous acid and/or a salt thereof. Specific examples of the hypohalous acid and/or a salt thereof include: sodium hypochlorite and lithium hypochlorite, sodium hypobromite, and lithium hypobromite; and sodium hypochlorite is particularly preferable from the viewpoint of reactivity and costs.

The oxidizing reaction is carried out as follows: Carbon black and hypohalite (for example, sodium hypochlorite) having an effective halogen concentration of 5 to 15% by weight are loaded into an appropriate amount of water, and this is stirred for not less than 5 hours, preferably, approximately 10 to 15 hours, at not less than 0° C., preferably at room temperature to 100° C. At this time, the carbon black is preferably ground beforehand, or is oxidized while being simultaneously ground. With respect to the grinding method, this is put in a ball mill, an attriter, a colloid mill or a sand mill together with beads of glass, zirconia, alumina, stainless magnetism and the like, and ground therein. In the case of carbon black that is easily ground, it is ground in a rotary homogenizer or a supersonic homogenizer.

Amount to be used of the hypohalite is different depending on its kind and effective halogen concentration; however, in general, it is from 0.5 to 150% by weight, more preferably, 1 to 75% by weight, at 100% conversion based upon weight of the carbon black.

The resulting surface modified carbon black has an oxygen content of not less than approximately 3% by weight, more preferably, not less than approximately 5% by weight. As a result of oxidation by a method of the present invention, oxygen content of carbon black increases to approximately several times larger than oxygen content of the carbon black before the treatment.

Oxygen content of the surface modified carbon black is measured by the "inert gas-infrared absorption method". In this method, the surface modified carbon black is heated in a flow of inert gas such as helium and the like, oxygen is extracted as carbon monoxide, and amount thereof is measured by the infrared absorption method. This method is described in JIS Z 2613-1976 in detail.

In general, in a reaction between carbon black and hypohalite, oxygen-based functional groups, such as a carboxyl group, a hydroxyl group, a carbonyl group and a lactone group, are generated on a surface of carbon black. The greater the above-mentioned oxygen content, the greater amount of the oxygen-based functional groups.

The surface modifying carbon black used in an aqueous pigment dispersion of the present invention is preferably have high oxygen content. The surface modifying carbon black of this type exhibits particularly superior water dispersing property.

Next, a dispersion of the surface modified carbon black after having been oxidized is filtered (in hot state), and the resulting wet cake is again dispersed in water; thereafter, beads and coarse particles are removed from this by using a metal mesh.

Next, by-product salt containing alkali metal cation that are generated upon wet-oxidizing carbon black, and halogen ion, are further removed from the surface modified carbon black obtained through oxidization. The alkali metal cation and the halogen ion are removed by washing the surface modified carbon black with water. The washing is preferably carried out by using deionized water such as ion exchanged water.

In general, washing with water is carried out by allowing deionized water to pass through the surface modified carbon black with a separation film that does not transmit the surface modified carbon black being placed. With respect to the separation film, a reverse permeation film or a ultrafiltration film is used. With respect to the reverse permeation film, NTR-7250, NTR-719HF and NTR-7410 made by Nitto Denko K.K. may be used, and with respect to the ultrafiltration film, NTU-2120, NTU-3150 and NTU-3520 made by Nitto Denko K.K. may be used.

The washing with water of the surface modified carbon black is preferably carried out until concentration of alkali metal cation has been reduced to not more than 2% by weight, preferably, not more than 1% by weight, more preferably, not more than 0.8% by weight. If concentration of alkali metal cation is not less than 2% by weight, aggregation of pigment particles becomes easily to occur, initial dispersing property and long-term dispersing property of pigment to water is not properly maintained; consequently, it becomes difficult to achieve the advantage of the present invention.

The washing with water of the surface modified carbon black is preferably carried out until concentration of halogen ion has been reduced to not more than 1000 ppm, preferably, not more than 500 ppm, more preferably, not more than 300 ppm. If concentration of halogen ion is not less than 1000 ppm, aggregation of pigment particles becomes easily to occur, initial dispersing property and long-term dispersing property of pigment to water is not properly maintained; consequently, it becomes difficult to achieve the advantage of the present invention.

Concentration of alkali metal cation may be accurately determined by using, for example, the atomic absorption analysis method. Alternatively, conductivity of the dispersion at the time of washing, or eluent water after washing is measured by a conductivity meter, thereby approximate concentration may indirectly be determined. By using such an indirect method, it becomes possible to easily know approximate concentration of alkali metal cation by simply dipping an electrode into the dispersion at the time of washing or into eluent water after washing, and also to know approximate concentration of alkali metal cation at real time without suspending the preparation process.

For example, in the present embodiment, it has been found through experiences that, in the case when conductivity of an aqueous solution is not more than 10 mS/cm, concentration of alkali metal cation is not more than 2% by weight, and that in the case when conductivity of an aqueous solution is not more than 5 mS/cm, concentration of alkali metal cation is not more than 1% by weight.

It is preferable that concentration of halogen ion is measured by using an ion electrode. This is because concentration of halogen ion is easily measured by simply dipping an electrode into the dispersion at the time of washing or into eluent water after washing. By using an ion electrode, it becomes possible to easily know concentration of halogen ion accurately at real time without suspending the preparation process.

With respect to a preferable ion electrode, for example, Chloride Ion Electrode 8002-10C, Bromide Ion Electrode 8005-10C, Iodide Ion Electrode 8004-10C and the like made by Horiba Seisakusho K.K. are listed.

Thereafter, pH of a dispersion of the surface modified carbon black may be adjusted, if necessary. With respect to a pH adjusting agent, hydroxide of alkali metal, such as lithium hydroxide, sodium hydroxide, potassium hydroxide, rubidium hydroxide, cesium hydroxide, aqueous ammonia, triethanol amine, diethanol amine and lower alkyl amine, or amines are listed. Preferably, potassium hydroxide and rubidium hydroxide are used.

Lithium hydroxide, sodium hydroxide or potassium hydroxide may be used as a pH adjusting agent; however, each of these has to be added so that amount of alkali metal cation contained in the aqueous pigment dispersion is not more than 2% by weight. If amount of the alkali metal cation is not less than 2% by weight, pigment particles easily aggregate, initial dispersing property and long-term dispersing property of pigment to water is not properly maintained.

Moreover, an antiseptic agent and a mildewproofing agent may be added to a dispersion of the present invention.

Furthermore, alkali metal cation (for example, sodium ion and lithium ion) in an aqueous pigment dispersion containing the surface modified carbon black may be substituted by potassium ion and rubidium ion. This is because an aqueous pigment dispersion of the present invention containing potassium ion and rubidium ion as alkali metal cation exhibits superior printing density when used as ink-jet ink.

It has been unknown the reason why the surface modified carbon black having potassium salt and rubidium salt exhibits printing density (OD value) higher than that having sodium salt and lithium salt; however, there is a tendency that those having greater ion radius have higher OD value (see Examples 4 to 8).

With respect to a method for substituting alkali metal ion in the aqueous pigment dispersion by potassium ion, the oxidized pigment liquid is filtered to obtain surface modified carbon black, and this is washed, and re-dispersed in water (preferably, in ion exchanged water). To this is added mineral acid, preferably hydrochloric acid, to adjust pH to acidic, preferably, to not more than 2.5, and this is stirred for approximately two hours, and filtered to remove salt generated by a neutralization process. Then, the resulting wet cake of the surface modified carbon black is again dispersed in ion exchanged water, and to this is added, for example, potassium hydroxide or rubidium hydroxide, or its aqueous solution, serving as a desired alkali metal ion adding agent, to adjust pH thereof from neutral to alkali, and this is held for approximately four hours while being stirred, if necessary; thus, the target aqueous pigment dispersion is obtained.

Thereafter, a ultrafiltration film or a reverse permeation film and the like is used to adjust concentration of alkali metal cation to not more than 2% by weight, preferably, not more than 1% by weight, more preferably, not more than 0.5% by weight; thus, an aqueous pigment dispersion of the present invention is obtained.

In general, the surface modified carbon black of the present invention is contained in the range of 1 to 40% by weight, preferably, in the range of 5 to 20% by weight, based on the whole amount of an aqueous pigment dispersion. The content of the surface modified carbon black less than 1% by weight causes an insufficient coloring density, and the content exceeding 30% by weight makes the surface modified carbon black more susceptible to aggregation, resulting in high viscosity during long-term storage or generation of precipitation; consequently, these contents are not preferable.

Average particle size of the surface modified carbon black in an aqueous pigment dispersion of the present invention is preferably not more than 300 nm, more preferably, not more than 150 nm. The average particle size of the surface modified carbon black exceeding 300 nm tends to cause precipitation of pigment.

EXAMPLES

The following Examples further illustrate the present invention in detail but are not to be construed to limit the scope thereof.

Example 1

To 500 g of water was mixed 50 g of commercially available carbon black "#990" (primary particle size: 16 nm, DBP oil absorption: 112 ml/100 g, made by Mitsubishi Kagaku K.K.), and this was ground by a ball mill with using zirconia beads. To this dispersion was dropwise added 400 g of sodium hypochlorite (effective chlorine concentration= 12% by weight), and this was stirred for 10 hours at room temperature to 100° C. The resulting slurry was filtered through quantitative filter paper No. 5A (made by Advantech Toyo K.K.), and further washed with water. This pigment wet cake was re-dispersed in 3 kg of water, and salts thereof were removed by using a reverse permeation film until conductivity had reached 3 mS/cm (measured by Model SC82 Personal SC Meter, made by Yokogawa Denki K.K.), and this was further concentrated to the pigment density of 10% by weight to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 0.6% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 280 ppm was obtained.

The pH of the resulting pigment dispersion was measured by Model PH82 Personal pH meter (made by Yokogawa Denki K.K.), thereby the value of 6.5 was obtained.

Conductivity of the resulting pigment dispersion was measured by Model SC82 Personal SC meter (made by Yokogawa Denki K.K.), thereby the value of 3.2 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 105 nm was obtained.

The resulting pigment dispersion was further concentrated, dried and finely ground to obtain fine powder of oxidized carbon black. Oxygen content of the resulting surface modified carbon black was measured by "inert gas-infrared absorption method", thereby the value of 6.5% by weight was obtained. This analysis was carried out under analyzing conditions shown in Table 1.

TABLE 1

| Analyzer | HERAEUS CHN-O Full automatic element analyzer |
| --- | --- |
| Sample decomposition furnace temperature | 1140° C. |
| Fractionating column temperature | 1140° C. |
| Applied gas | Mixed gas of $N_2/H_2 = 95\%/5\%$ |
| Gas flow rate | 70 ml/min. |
| Detector | Non-dispersion-type spectrometer (Binos) |

A small amount of the resulting pigment dispersion was taken, and this was observed under an optical microscope at 400 times magnification; superior dispersion state with the entire portion making micro Brownian movements was shown. Moreover, even when the observation under the microscope was continued, no aggregation was found with elapsing time.

Furthermore, the resulting pigment dispersion was put into a sealed container, and this was stored for one month at 50° C. However, the dispersion after having been stored was free from aggregation and the like, and viscosity and average particle size were remain unchanged from the values before storage.

Example 2

To 1000 g of water was mixed 100 g of commercially available carbon black "Printex 30" (primary particle size: 27 nm, DBP oil absorption: 103 ml/100 g, made by Degussa Corp.), and this was ground by a ball mill with using zirconia beads. To this dispersion was dropwise added 600 g of sodium hypochlorite (effective chlorine concentration=12% by weight), and this was stirred for 10 hours at room temperature to 100° C. The resulting slurry was filtered through quantitative filter paper No. 5A (made by Advantech Toyo K.K.), and further washed with water. This pigment wet cake was re-dispersed in 5 kg of water, and salts thereof were removed by using a reverse permeation film until conductivity had reached 1.8 mS/cm (measured by Model SC82 Personal SC Meter, made by Yokogawa Denki K.K.), and this was further concentrated to the pigment density of 10% by weight to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 0.4% by weight was obtained.

The pH of the resulting pigment dispersion was measured by Model PH82 Personal pH meter (made by Yokogawa Denki K.K.), thereby the value of 6.0 was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 240 ppm was obtained.

Conductivity of the resulting pigment dispersion was measured by Model SC82 Personal SC meter (made by Yokogawa Denki K.K.), thereby the value of 2.1 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 135 nm was obtained.

In the same manner as described in Example 1, oxygen content of the surface modified carbon black was measured, thereby the value of 6% by weight was obtained.

A small amount of the resulting pigment dispersion was taken, and this was observed under an optical microscope at 400 times magnification; superior dispersion state with the entire portion making micro Brownian movements was shown. Moreover, even when the observation under the microscope was continued, no aggregation was found with elapsing time.

Furthermore, the resulting pigment dispersion was put into a sealed container, and this was stored for one month at 50° C. However, the dispersion after having been stored was free from aggregation and the like, and viscosity and average particle size were remain unchanged from the values before storage.

Example 3

To 2000 g of water was mixed 200 g of commercially available carbon black "Color Black S170" (primary particle size: 17 nm, DBP oil absorption: 150 ml/100 g, made by Degussa Corp.), and this was ground by a ball mill with using zirconia beads. To this dispersion was dropwise added 3000 g of sodium hypochlorite (effective chlorine concentration=12% by weight), and this was allowed to react for 5 hours, while being ground by the ball mill, and this was further stirred for 10 hours at room temperature to 100° C. The resulting slurry was filtered through quantitative filter paper No. 5A (made by Advantech Toyo K.K.), and further washed with water. This pigment wet cake was re-dispersed in 9 kg of water, and salts thereof were removed by using a reverse permeation film until conductivity had reached 2 mS/cm (measured by Model SC82 Personal SC Meter, made by Yokogawa Denki K.K.), and this was further concentrated to the pigment density of 10% by weight. To the resulting aqueous pigment dispersion was added sodium hydroxide as a pH adjusting agent until pH becomes 8.0 to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 0.8% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 290 ppm was obtained.

The pH of the resulting pigment dispersion was measured by Model PH82 Personal pH meter (made by Yokogawa Denki K.K.), thereby the value of 8.0 was obtained.

Conductivity of the resulting pigment dispersion was measured by Model SC82 Personal SC meter (made by Yokogawa Denki K.K.), thereby the value of 4 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 115 nm was obtained.

In the same manner as described in Example 1, oxygen content of the surface modified carbon black was measured, thereby the value of 8% by weight was obtained.

A small amount of the resulting pigment dispersion was taken, and this was observed under an optical microscope at 400 times magnification; superior dispersion state with the entire portion making micro Brownian movements was shown. Moreover, even when the observation under the microscope was continued, no aggregation was found with elapsing time.

Furthermore, the resulting pigment dispersion was put into a sealed container, and this was stored for one month at 50° C. However, the dispersion after having been stored was free from aggregation and the like, and viscosity and average particle size were remain unchanged from the values before storage.

Comparative Example 1

To 500 g of water was mixed 50 g of commercially available carbon black "#990" (primary particle size: 16 nm, DBP oil absorption: 112 ml/100 g, made by Mitsubishi Kagaku K.K.), and this was ground by a ball mill with using zirconia beads. To this dispersion was dropwise added 400 g of sodium hypochlorite (effective chlorine concentration= 12% by weight), and this was stirred for 10 hours at room temperature to 100° C. The resulting slurry was filtered through quantitative filter paper No. 5A (made by Advantech Toyo K.K.). This pigment wet cake was adjusted to the pigment density of 10% by weight to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 5% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 1010 ppm was obtained.

The pH of the resulting pigment dispersion was measured by Model PH82 Personal pH meter (made by Yokogawa Denki K.K.), thereby the value of 6.5 was obtained.

Conductivity of the resulting pigment dispersion was measured by Model SC82 Personal SC meter (made by Yokogawa Denki K.K.), thereby the value of 20 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 320 nm was obtained.

In the same manner as described in Example 1, oxygen content of the surface modified carbon black was measured, thereby the value of 6.5% by weight was obtained.

A small amount of the resulting pigment dispersion was taken, and when this was observed under an optical microscope at 400 times magnification, aggregations having a particle size of not less than 600 nm were found. Moreover, when the observation under the microscope was continued, the number of aggregations increased with elapsing time.

Furthermore, the resulting pigment dispersion was put into a sealed container, and this was stored for one month at 50° C. The dispersion after having been stored had increased viscosity by comparison with the dispersion immediately after the preparation process, and was gelled.

Comparative Example 2

To 1000 g of water was mixed 100 g of commercially available carbon black "Printex 30" (primary particle size: 27 nm, DBP oil absorption: 103 ml/100 g, made by Degussa Corp.), and this was ground by a ball mill with using zirconia beads. To this dispersion was dropwise added 600 g of sodium hypochlorite (effective chlorine concentration= 12% by weight), and this was stirred for 10 hours at room temperature to 100° C. The resulting slurry was filtered through quantitative filter paper No. SA (made by Advantech Toyo K.K.), and further washed with water. This pigment wet cake was re-dispersed in 5 kg of water, and salts thereof were removed by using a reverse permeation film until conductivity had reached 15 mS/cm (measured by Model SC82 Personal SC Meter, made by Yokogawa Denki K.K.), and this was. further concentrated to the pigment density of 10% by weight to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 3% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 680 ppm was obtained.

The pH of the resulting pigment dispersion was measured by Model PH82 Personal pH meter (made by Yokogawa Denki K.K.), thereby the value of 6.0 was obtained.

Conductivity of the resulting pigment dispersion was measured by Model SC82 Personal SC meter (made by Yokogawa Denki K.K.), thereby the value of 16 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 160 nm was obtained.

In the same manner as described in Example 1, oxygen content of the surface modified carbon black was measured, thereby the value of 6% by weight was obtained.

A small amount of the resulting pigment dispersion was taken, and when this was observed under an optical microscope at 400 times magnification, aggregations having a particle size of not less than 350 nm were found. Moreover, when the observation under the microscope was continued, the number of aggregations increased with elapsing time.

Furthermore, the resulting pigment dispersion was put into a sealed container, and this was stored for one month at 50° C. The dispersion after having been stored had increased viscosity by comparison with the dispersion immediately after the preparation process, and was gelled.

Comparative Example 3

To 2000 g of water was mixed 200 g of commercially available carbon black "Color Black S170" (primary particle size: 17 nm, DBP oil absorption: 150 ml/100 g, made by Degussa Corp.), and this was ground by a ball mill with using zirconia beads. To this dispersion was dropwise added 3000 g of sodium hypochlorite (effective chlorine concentration=12% by weight), and this was allowed to react for 5 hours, while being ground by the ball mill, and this was further stirred for 10 hours at room temperature to 100° C. The resulting slurry was filtered through quantitative filter paper No. 5A (made by Advantech Toyo K.K.), and further washed with water. This pigment wet cake was re-dispersed in 9 kg of water, and salts thereof were removed by using a reverse permeation film until conductivity had reached 2 mS/cm, and this was further concentrated to the pigment density of 10% by weight. To the resulting aqueous pigment dispersion was added sodium hydroxide as a pH adjusting agent until pH becomes 12.5 to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 2.5% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 240 ppm was obtained.

The pH of the resulting pigment dispersion was measured by Model PH82 Personal pH meter (made by Yokogawa Denki K.K.), thereby the value of 12.5 was obtained.

Conductivity of the resulting pigment dispersion was measured by Model SC82 Personal SC meter (made by Yokogawa Denki K.K.), thereby the value of 12 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 115 nm was obtained.

In the same manner as described in Example 1, oxygen content of the surface modified carbon black was measured, thereby the value of 8% by weight was obtained.

A small amount of the resulting pigment dispersion was taken, and when this was observed under an optical microscope at 400 times magnification, a good dispersion state was found with the entire portion making micro Brownian movements. However, when the observation under the microscope was continued, aggregations having a particle size of not less than 300 nm were generated, and the aggregations increased in number, and the particle size also increased.

Furthermore, the resulting pigment dispersion was put into a sealed container, and this was stored for one month at 50° C. The dispersion after having been stored had increased viscosity by comparison with the dispersion immediately after the preparation process, and was gelled.

The results of the tests on aqueous pigment dispersions of Examples 1 to 3 and Comparative Examples 1 to 3 are collectively shown in Table 2.

TABLE 2

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Sodium ion concentration (wt %) | 0.6 | 0.4 | 0.8 | 5 | 3 | 2.5 |
| Chlorine ion concentration (ppm) | 280 | 240 | 290 | 1010 | 680 | 240 |
| pH | 6.5 | 6.0 | 8.0 | 6.5 | 6.0 | 12.5 |
| Conductivity (mS/cm) | 3.2 | 2.1 | 4.0 | 20 | 16 | 12 |
| Average particle size (nm) | 105 | 135 | 115 | 320 | 160 | 115 |
| Oxygen content (wt %) | 6.5 | 6 | 8 | 6.5 | 6 | 8 |
| Aggregation | No | No | No | Yes | Yes | Yes |
| Aggregation with time | No | No | No | Yes | Yes | Yes |
| Change in property after storage at 50° C. | No | No | No | Large | Large | Large |

Example 4

To 2000 g of water was mixed 200 g of commercially available carbon black "#990" (primary particle size: 16 nm, DBP oil absorption: 112 ml/100 g, made by Mitsubishi Kagaku K.K.), and this was ground by a ball mill with using zirconia beads. To this dispersion was dropwise added 3000 g of sodium hypochlorite (effective chlorine concentration=12% by weight), and this was allowed to react for five hours while being ground by the ball mill, and further stirred for 10 hours at room temperature to 100° C. The resulting slurry was filtered through quantitative filter paper No. 5A (made by Advantech Toyo K.K.), and further washed with water. This pigment wet cake was re-dispersed in 9 kg of water, and adjusted to have a pH of 2.5 by using 200 g of aqueous hydrochloric acid. This was stirred at room temperature for two hours, and the modified carbon black was filtered and taken, thereby wet cake A was obtained.

Next, a ¼ of the resulting wet cake A was dispersed in 1000 ml of ion exchanged water, and to this was added 60 g of sodium hydroxide solution having the concentration of 5% by weight to adjust the pH thereof to 7. Then, salts thereof were removed by using a reverse permeation film until conductivity had reached 2 mS/cm, and this was further concentrated to the pigment density of 10% by weight. To the resulting aqueous pigment dispersion was added sodium hydroxide as a pH adjusting agent until pH becomes 8 to prepare an aqueous pigment dispersion.

Sodium ion concentration of the resulting pigment dispersion was measured by an atomic absorption analyzing device (Shimadzu atomic absorption/frame spectrophotometer, AA-660; made by Shimadzu Seisakusho K.K.), thereby the value of 0.8% by weight was obtained.

Chlorine ion concentration of the resulting pigment dispersion was measured by a chloride ion electrode (chloride ion electrode 8002-10C, Ion Meter F23C; made by Horiba Seisakusho K.K.), thereby the value of 280 ppm was obtained.

The pH of the resulting pigment dispersion was measured by Model PH82 Personal pH meter (made by Yokogawa Denki K.K.), thereby the value of 8.0 was obtained.

Conductivity of the resulting pigment dispersion was measured by Model SC82 Personal SC meter (made by Yokogawa Denki K.K.), thereby the value of 4.0 mS/cm was obtained.

Moreover, average particle size of the surface modified carbon black contained in the aqueous pigment dispersion was measured by a laser light diffusion method particle-size distribution measuring instrument (LPA3000/3100 made by Ohtsuka Denshi K.K.), thereby the value of 105 nm was obtained.

In the same manner as described in Example 1, oxygen content of the surface modified carbon black was measured, thereby the value of 7.5% by weight was obtained.

A small amount of the resulting pigment dispersion was taken, and this was observed under an optical microscope at 400 times magnification; superior dispersion state with the entire portion making micro Brownian movements was shown. Moreover, even when the observation under the microscope was continued, no aggregation was found with elapsing time.

Furthermore, the resulting pigment dispersion was put into a sealed container, and this was stored for one month at 50° C. However, the dispersion after having been stored was free from aggregation and the like, and viscosity and average particle size were remain unchanged from the values before storage.

The resulting pigment dispersion having the concentration of 10% was used to prepare a solution containing the surface modified carbon black having the concentration of 2%. Quantitative filter paper No. 5A (made by Advantech Toyo K.K.) was dipped into this (for five minutes), and dried in air so as to be dyed with the modified carbon black. Reflection density was measured using Macbeth densitometer TR-927 (made by Kolmorgen Corp.), thereby the value of 1.44 was obtained. Table 3 shows the results of the test.

Example 5

A ¼ of wet cake A obtained in Example 4 was dispersed in 1000 ml of ion exchanged water, and to this was added 75 g of potassium hydroxide solution having a concentration of 5% by weight to adjust the pH thereof to 7. Then, salts thereof were removed by using a reverse permeation film until conductivity had reached 2 mS/cm, and this was further concentrated to the pigment density of 10% by weight. To the resulting aqueous pigment dispersion was added potassium hydroxide as a pH adjusting agent until pH becomes 8 to prepare an aqueous pigment dispersion.

The same processes as Example 4 were carried out, and the results are shown in Table 3.

Example 6

A ¼ of wet cake A obtained in Example 4 was dispersed in 1000 ml of ion exchanged water, and to this was added 160 g of rubidium hydroxide solution having the concentration of 5% by weight to adjust the pH thereof to 7. Then, salts thereof were removed by using a reverse permeation film until conductivity had reached 2 mS/cm, and this was further concentrated to the pigment density of 10% by weight. To the resulting aqueous pigment dispersion was added rubidium hydroxide as a pH adjusting agent until pH becomes 8 to prepare an aqueous pigment dispersion.

The same processes as Example 4 were carried out, and the results are shown in Table 3.

Example 7

To 2000 g of water was mixed 200 g of commercially available carbon black "#990" (primary particle size: 16 nm, DBP oil absorption: 112 ml/100 g, made by Mitsubishi Kagaku K.K.), and this was ground by a ball mill with using zirconia beads. To this dispersion was dropwise added 3000 g of sodium hypochlorite (effective chlorine concentration= 12% by weight), and this was allowed to react for five hours while being ground by the ball mill, and further stirred for 10 hours at room temperature to 100° C. The resulting slurry was filtered through quantitative filter paper No. 5A (made by Advantech Toyo K.K.), and further washed with water. This pigment wet cake was re-dispersed in 9 kg of water, and salts thereof were removed by using a reverse permeation film until conductivity had reached 2 mS/cm, and this was further concentrated to the pigment density of 10% by weight.

To the resulting aqueous pigment dispersion was added potassium hydroxide as a pH adjusting agent until pH becomes 8 to prepare an aqueous pigment dispersion.

The same processes as Example 4 were carried out, and the results are shown in Table 3.

Example 8

A ¼ of wet cake A obtained in Example 4 was dispersed in 1000 ml of ion exchanged water, and to this was added 40 g of lithium hydroxide solution having a concentration of 5% by weight to adjust the pH thereof to 7. Then, salts thereof were removed by using a reverse permeation film until conductivity had reached 2 mS/cm, and this was further concentrated to the pigment density of 10% by weight. To the resulting aqueous pigment dispersion was added lithium hydroxide as a pH adjusting agent until pH becomes 8 to prepare an aqueous pigment dispersion.

The same processes as Example 4 were carried out, and the results are shown in Table 3.

TABLE 3

|  | Ex. 4 | Ex. 5 | Ex. 6 | Ex. 7 | Ex. 8 |
| --- | --- | --- | --- | --- | --- |
| $Li^+$ concentration (wt %) | (ND*) | (ND*) | (ND*) | (ND*) | 0.25 |
| $Na^+$ concentration (wt %) | 0.8 | (ND*) | (ND*) | 0.4 | (ND*) |
| $K^+$ concentration (wt %) | (ND*) | 0.9 | (ND*) | 0.5 | (ND*) |
| $Rb^+$ concentration (wt %) | (ND*) | (ND*) | 1.2 | (ND*) | (ND*) |
| $Cl^-$ concentration (ppm) | 280 | 285 | 290 | 280 | 295 |
| pH | 8.0 | 8.0 | 8.0 | 8.0 | 8.0 |
| Conductivity (mS/cm) | 4.0 | 4.0 | 4.0 | 4.0 | 4.0 |
| Average particle size (nm) | 105 | 105 | 108 | 105 | 100 |
| Oxygen content (wt %) | 7.5 | 7.5 | 7.5 | 7.5 | 7.5 |
| Aggregation | No | No | No | No | No |
| Aggregation with time | No | No | No | No | No |
| Change in property after storage at 50° C. | No | No | No | No | No |
| Printing density of 2% pigment dispersion (OD value) | 1.44 | 1.50 | 1.53 | 1.47 | 1.40 |

(ND*): Not detected

EFFECTS OF THE INVENTION

In the aqueous pigment dispersion of the present invention, carbon black particles are less susceptible to aggregation, and appropriate initial dispersing property and long-term dispersing property are kept. Moreover, the aqueous pigment dispersion of the present invention which is substituted by potassium ion, provides remarkably improved printing density. It becomes possible to easily prepare an aqueous pigment dispersion having the above-mentioned advantages by a preparation method of the present invention.

What is claimed is:

1. A preparation method of an aqueous pigment dispersion comprising the steps of:

finely dispersing carbon black into water;

oxidizing the carbon black by using hypohalous acid and/or an alkali metal salt thereof;

substituting a part of or the whole of alkali metal cation in the disperation by potassium ion; and adjusting concentration of potassium ion in the dispersion to not more than 2% by weight.

* * * * *